(12) United States Patent
Atley

(10) Patent No.: US 7,726,423 B2
(45) Date of Patent: Jun. 1, 2010

(54) DRIVEN STEER CARRIAGE

(75) Inventor: Kerry Atley, Grahamvale (AU)

(73) Assignee: Trackaxle Pty Ltd, Victoria (AU)

( * ) Notice: Subject to any disclaimer, the term of this patent is extended or adjusted under 35 U.S.C. 154(b) by 787 days.

(21) Appl. No.: 10/578,886

(22) PCT Filed: Nov. 9, 2004

(86) PCT No.: PCT/AU2004/001546

§ 371 (c)(1),
(2), (4) Date: Jan. 5, 2007

(87) PCT Pub. No.: WO2005/047083

PCT Pub. Date: May 26, 2005

(65) Prior Publication Data

US 2007/0084647 A1 Apr. 19, 2007

(30) Foreign Application Priority Data

Nov. 13, 2003 (AU) .............................. 2003906278

(51) Int. Cl.
*B62D 61/10* (2006.01)
*B62D 11/02* (2006.01)

(52) U.S. Cl. .................. 180/24.01; 180/23; 180/22

(58) Field of Classification Search ............ 180/22, 180/23, 24.01; 280/124.117
See application file for complete search history.

(56) References Cited

U.S. PATENT DOCUMENTS

| 1,402,175 | A |   | 1/1922 | Overman |
|-----------|---|---|--------|---------|
| 3,454,123 | A | * | 7/1969 | Lewis ........................... 180/23 |
| 3,591,203 | A | * | 7/1971 | Steiner ........................ 280/426 |
| 4,570,965 | A | * | 2/1986 | Caswell ...................... 280/426 |
| 5,171,035 | A | * | 12/1992 | Brown ........................ 280/442 |
| 6,299,187 | B1 |  | 10/2001 | Klun et al. |

FOREIGN PATENT DOCUMENTS

| CH | 116045 A | 8/1926 |
| FR | 2518950 A | 7/1983 |
| SU | 1533932 A1 | 1/1990 |
| WO | WO-83/02758 A1 | 8/1983 |
| WO | WO-90/00487 A1 | 1/1990 |
| WO | WO-02/44005 A1 | 6/2002 |

* cited by examiner

*Primary Examiner*—Paul N Dickson
*Assistant Examiner*—Drew Brown
(74) *Attorney, Agent, or Firm*—Birch, Stewart, Kolasch & Birch, LLP

(57) ABSTRACT

A vehicle having a main chassis (3) and a power source (4) for driving the vehicle, a drivable steer carriage (1) pivotally supporting the main chassis (3) about an at least substantially upright pivotal axis (2), the carriage including a plurality of opposed pairs of carriage wheels (5a, 7a, 9a), at least one said pair of carriage wheels being driven by a drive transmission including an input shaft (17a) at least substantially aligned with said upright pivotal axis (2) such that the power source (4) can transfer power through the input shaft (17a) to at least one carriage wheel pair.

9 Claims, 3 Drawing Sheets

DRIVEN STEER CARRIAGE

The present invention is generally directed to road transport vehicles, and in particular to vehicles used for carrying loads such as packaged food products and farm produce.

Articulated vehicles are commonly used in for road transport because of their high load capacity. These articulated vehicles, typically known as a "semi-trailer", normally consist of a prime mover to which is pivotally attached a single trailer. These trailers are substantially longer in length than the prime mover and provide a load carrying tray. The tray is generally supported by a plurality of a non-steerable axles located at a rear end of the trailer. A turntable is provided at the front end of the trailer for coupling with the prime mover. The turntable, sometimes termed a "fifth wheel", allows the trailer to articulate about a substantially vertical axis relative to the prime mover. This enables the semi-trailer to articulate thereby enabling the semi-trailer to turn around corners and otherwise manoeuvre along the road networks.

Because the trailer is typically significantly longer than the prime mover, this can lead to problems when the prime mover is required to turn tight corners or manoeuvre in tight quarters. This is because the path followed by the wheels of the prime mover can be quite different to the path followed by the wheels of the trailer in a phenomenon known as "off tracking". This results in what is known as "tyre scrubbing" where the tyres of the trailer axles are simultaneously rolled and dragged over the road surface. This leads to premature wearing of the tread portion of the tyres of the trailer wheels.

In the Applicant's Australian Patent Application No. 2002223009, details of which are incorporated herein by reference, there is described a trailer arrangement which seeks to at least alleviate the problems referred to above. This arrangement includes a trailer for an articulated vehicle, the trailer including a main chassis pivotally connectable to a prime mover, and a sub chassis upon which are mounted the trailer wheels. The sub chassis is connected to and pivotal relative to the main chassis. Means are provided to restrict the maximum angle of pivoting of the chassis away from the longitudinal axis of the main chassis in dependence the degree of articulation of the trailer relative to the prime mover. This arrangement allows for the articulated vehicle to turn in a relatively narrower turning path than conventional articulated vehicles. Furthermore, this may be achieved while at the same time significantly reducing tyre scrubbing of the trailer wheels because there is less off tracking by the trailer wheels relative to the wheels of the prime mover.

Nevertheless, the overall length of the articulated body from the front of the prime mover to the back of the trailer does still provide a limitation on the turning circle and overall manoeuvrability of the articulated vehicle. It is for this reason that new prime mover designs are relatively shorter in overall length than older designs. While this can lead to improved manoeuvrability of the articulated vehicle, the shorter wheel base of these newer prime movers does have a detrimental effect on the ride comfort of the driver. Also, there is always wasted space on the trailer needed to allow for the articulation of the vehicle which reduces the overall load carrying capacity of the vehicle. It is also often difficult for the driver to see what is happening to the trailer leading to potential safety issues because the driver is located in a cabin separate to the trailer.

It is therefore an object of the present invention to minimise or overcome at least one of the abovenoted problems associated with articulated vehicles.

With this in mind, according to one aspect of the present invention, there is provided a vehicle having a main chassis and a power source for driving the vehicle, a drivable steer carriage pivotally supporting the main chassis about an at least substantially upright pivotal axis, the carriage including a plurality of opposed pairs of carriage wheels, at least one said pair of carriage wheels being driven by a drive transmission including an input shaft at least substantially aligned with said upright pivotal axis such that the power source can transfer power through the input shaft to at least one carriage wheel pair.

The vehicle according to the present invention may be steered by pivoting the steer carriage at an angle to the longitudinal axis of the main chassis of the vehicle. The power source for driving the carriage wheels may be in the form of an internal combustion engine or an electric motor. Other forms of power sources are however also envisaged. The power source may be supported on the main chassis because the input shaft is aligned with the axis of rotation of the carriage. This enables power to be transferred to the carriage wheels at any time even during the pivoting of the carriage relative to the main chassis.

The steer carriage may include a front pair of said carriage wheels driven by the drive transmission. A middle said pair of carriage wheels may also be provided, the axis of rotation of said middle carriage wheels generally being located below the input shaft. The middle pair of wheels provides greater stability for the steer carriage and do not need to be driven. Preferably a rear pair of carriage wheels may also be provided, said pair of carriage wheels being also preferably driven by the drive transmission. If a front and rear pair of carriage wheels are provided, then it is also possible to eliminate the need for the said middle pair of wheels.

It should be noted that when we refer to "wheels", this term also encompasses multiple wheel sets of the type typically used in large transport vehicles in addition to single wheels.

A turntable may be provided between the steer carriage and the main chassis to allow for said pivoting of the stair carriage relative to the main chassis. The turntable may typically include a ball race to allow for smoother movement. Other forms of turntables are however envisaged.

The steer carriage may include a sub frame, and the front and rear said pair of carriage wheels may be respectively supported on a front and rear wheel axle, each said wheel axle including a drive arrangement for driving the rotation of the wheels. The drive arrangement may typically be in the form of a differential drive centrally located on said wheel axle. Each said front and rear wheel axle may be respectively provided on a turntable to allow the wheel axles to pivot relative to the sub-frame. Steering means may be respectively connected to each said wheel axle turntable to enable control of the rotation of each turntable relative to the sub-frame thereby allowing the steer carriage to be steered. The steering means may be controlled by a driver riding on the main chassis of the vehicle.

The drive transmission of the steer carriage further includes a central transfer unit mounted to the sub-frame, the upright input shaft extending from said central transfer unit. This central transfer unit may typically enclose a gear assembly providing at least one output shaft. Two output shafts may be provided where both the front and rear carriage wheel pairs are to be driven.

A front and rear wheel transfer unit may also be respectively provided at the or each driven wheel axle to enable the differential drive of said wheel axle to be driven. Said front and/or rear wheel transfer units may typically also include a gear assembly for driving the differential drive of the wheel axle. Drive shafts may interconnect the central transfer unit to the front transfer unit and rear wheel transfer unit. Each drive shaft may be coupled to a said output shaft of the central transfer unit via a universal joint. Each drive shaft may be coupled at opposing ends thereof to an input shaft of the front or rear wheel transfer unit by a universal joint.

The central transfer unit may be mounted to the carriage sub-frame and may therefore be fixed in position relative to the sub-frame. The front and rear wheel transfer unit may also be coupled to the sub-frame to prevent or minimise rotation of the transfer unit relative to said sub-frame.

The steer carriage is typically provided at or adjacent a front end of the main chassis of the vehicle. A trailer arrangement as described in the Applicant's Australian Patent Application No. 2002223009 may be provided at or adjacent rear end of the main chassis of the vehicle. Means may be provided to determine the angular position of the steer carriage relative to the main chassis to thereby control the movement of the rear trailer arrangement in a similar manner to that described in the above-noted Australian patent application.

It however also envisaged that a second said steer carriage may also be provided at or adjacent the rear end of the main chassis, with means being provided to allow for power to be directed to each said steer carriage. It is however also envisaged that a conventional set of fixed trailer wheels may be provided at or adjacent the rear end of the main chassis. While this arrangement will still have some off tracking problems, this arrangement can facilitate the use of the driven steer carriage for conventional trailers for articulated vehicles. While this is a less desirable option, there may be cost benefits achieved by adapting conventional trailers for this steer carriage.

The use of a steer carriage has a number of advantages. Firstly, this reduces the overall length of the vehicle allowing for the vehicle to turn around tighter circles and to be more manoeuvrable. Furthermore, as the drive carriage is located under the main chassis, and the power source is located on the main chassis, the driver can sit on and move with the main chassis. This effectively provides a much longer wheel base leading to improve vehicle ride and greater driver comfort. Furthermore, the driver is more able to see what is happening with the rest of the vehicle, and in particular, the load carrying platform of the main chassis. This leads to greater safety in use of the vehicle. Furthermore, less space is wasted on the load carrying platform as would be the case in articulated vehicles.

According to another aspect of the present invention, there is provided a driveable steer carriage for a vehicle having a main chassis and a power source for driving the vehicle, the steer carriage being adapted to pivotally support the main chassis thereon about and at least substantially upright pivotal axis, the carriage including a plurality of opposed pairs of carriage wheels, at least one said pair of carriage wheels being driven by a drive transmission including an input shaft at least substantially aligned with said upright pivotal axis such that the power source can transfer power through the input shaft to the at least one carriage wheel pair.

The accompanying drawings illustrate preferred embodiments of the present invention. Other embodiments are possible, and consequently the particularity of the accompanying drawings is not to be understood as superseding the generality of the proceeding description of the invention.

Figure 1:
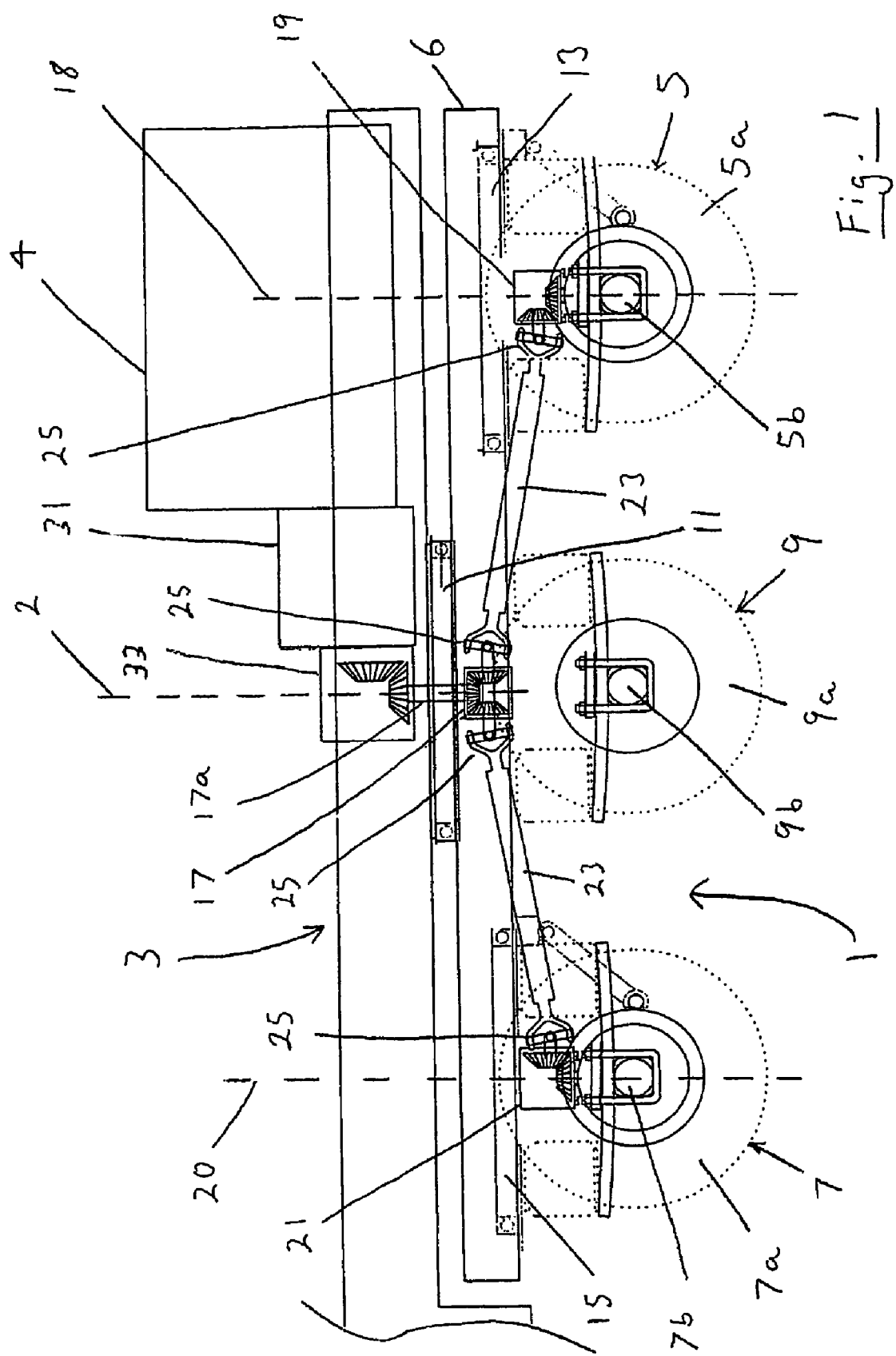
FIG. 1 is a schematic side view of a driveable steer carriage according to a preferred embodiment of the present invention.
Figure 2:
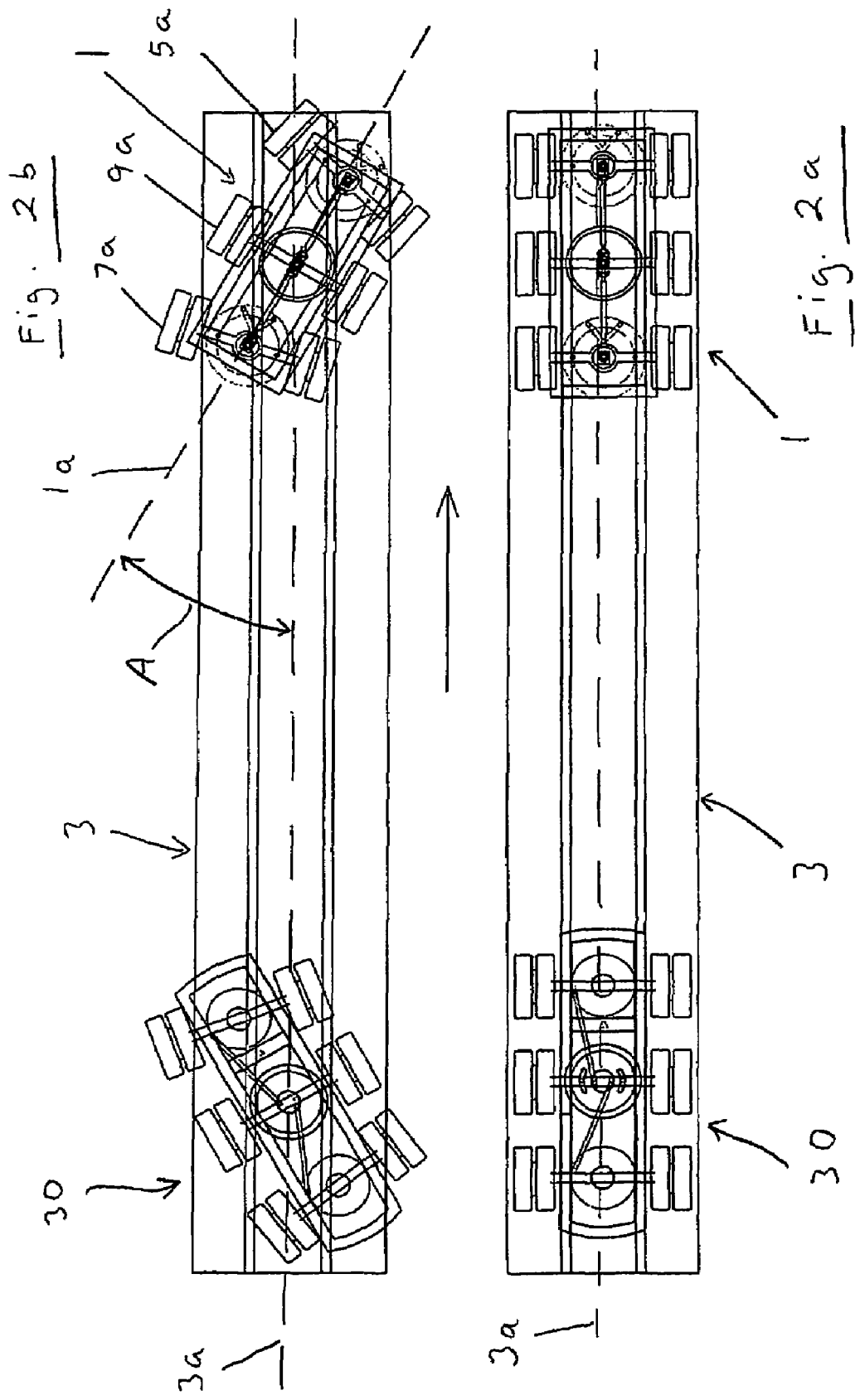
FIGS. 2a and 2b are respectively a top plan views of a vehicle having the steer carriage of FIG. 1.

Referring initially to FIG. 1, a driveable steer carriage 1 is shown schematically in this drawing. Extraneous details common to the art have been omitted from this drawing for clarity reasons. The steer carriage 1 pivotally supports a main chassis 3 of a vehicle as best shown in FIGS. 2a and 2b. The main chassis 3 is pivotally supported about an at least substantially upright pivot axis 2. The steer carriage 1 can pivot about the said upright pivotal axis relative to the main chassis 3. A ball race 11 is provided between the main chassis 3 and a sub-frame 6 of the steer carriage 1 to allow for said pivotal movement therebetween.

The carriage sub-frame 6 is supported on a front wheel assembly 5, a rear wheel assembly 7 and a middle wheel assembly 9. Each wheel assembly includes a pair of wheel sets 5a, 7a, 9a as best shown in FIGS. 2a and 2b. Each pair of wheel sets are respectively supported on a front wheel axle 5b, a rear wheel axle 7b and a middle wheel axle 9b. Each wheel axle 5b, 7b, 9b are supported by conventional suspension components and will not be described herein. Both the front wheel assembly 5 and the rear wheel assembly 7 are respectively supported on a front turntable 13 and a rear turntable 15. This allows the front wheel assembly 5 and rear wheel assembly 7 to be pivoted relative to the carriage sub-frame 6. The middle wheel assembly 9 is mounted directly to the sub-frame 6 and is therefore fixed relative to the carriage sub-frame 6.

The steer carriage 1 further includes a central transfer unit 17 having an at least substantially upright input shaft 17a extending therefrom. The central transfer unit box 17 is secured to and fixed relative to the carriage sub-frame 6 with the axis of rotation of the input shaft 17a being aligned with the pivotal axis 2 of the steer carriage 1. A front transfer unit 19 is also provided over the front wheel axle 5b. Furthermore, a rear transfer unit 21 is located over the rear wheel axle 7b. Both the front and rear wheel axles 5b, 7b incorporate a conventional differential drive therein (not shown). The front transfer unit 19 and rear transfer unit 21 respectively transfer power to each said differential drive to thereby drive the front and rear wheel assemblies 5, 7. The front transfer unit 19 is located over an at least substantially upright pivot axis 18 of the front wheel assembly 5, with the output shaft of the front transfer unit 19, transferring power to the differential drive of the front wheel axis 5b. The front transfer unit 19 is held in a fixed relationship relative to the carriage sub-frame 6. A similar arrangement is provided for the rear transfer unit 21 which is located over an at least substantially upright pivotal axis 20 of the rear wheel axle 7b, the rear transfer unit 21 being also held in a fixed relationship relative to the carriage sub-frame 6. The central transfer unit 17 is interconnected with the front transfer box 19 and the rear transfer unit 21 by means of drive axles 23. Each drive axle 23 is connected at each end thereof via universal joints 25 to respective drive shafts of said transfer units 19,21.

FIGS. 2a and 2b respectively show the steer carriage 1 when the vehicle is travelling in a straight line (FIG. 2a) and when the vehicle is turning (FIG. 2b). When the vehicle is turning, the steer carriage 1 pivots about the upright pivot axis 2 so that the longitudinal axis 1a of the carriage 1 is at an angle A to the longitudinal axis 3a of the main chassis 3. This allows for turning and manoeuvring of the vehicle. When the angle A is 0° as shown in FIG. 2a, the vehicle will travel in a straight line.

The main chassis 3 is shown supported at the rear end thereof by a trailer arrangement of a type as described in the Applicant's Australian Patent Application No. 2002223009. Details of this trailer arrangement 30 are incorporated herein by reference and will therefore not be described herein in any detail. We do however note that the trailer arrangement 30 can also be pivoted relative to the longitudinal axis 3a of the main chassis 3, thereby facilitating the turning circle and manoeuvrability of the vehicle. In straight line travel, the trailer arrangement 30 can be locked in position and aligned with the longitudinal axis 3a of the main chassis 3 as shown in 2a. It is however also envisaged that the main chassis 3 be supported at its rear end by the steer carriage 1 of the present invention.

The main chassis 3 supports a power source 4 in the form of an engine or electric motor. The power source 4 drives the front and rear wheel assemblies 5, 7 through the upright input shaft 17a of the central transfer unit 17. This may be achieved through conventional means, namely a gear unit 31 and a gear assembly 33 connected to the upright input shaft 17a.

Figure 3:
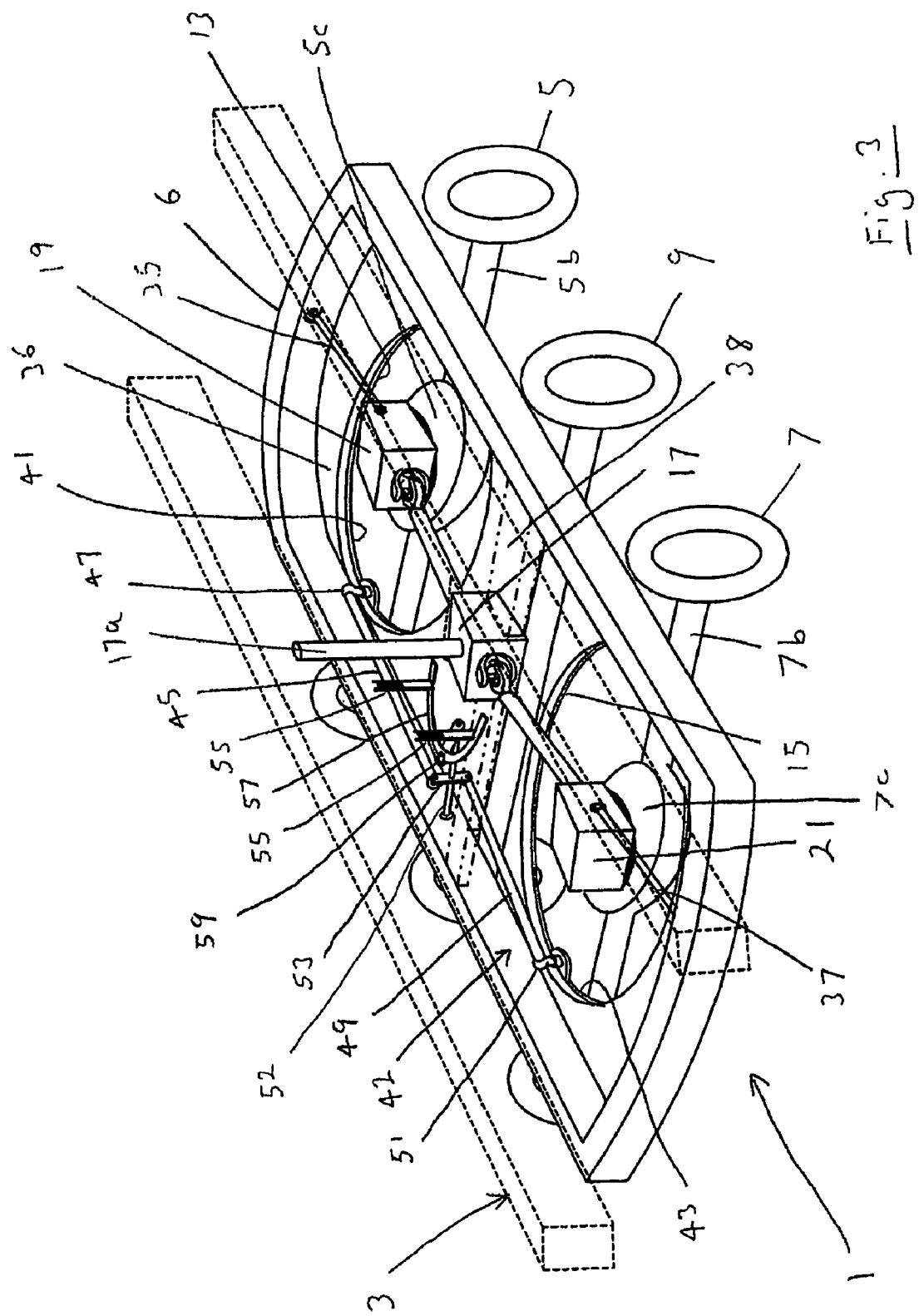
FIG. 3 is a perspective view of a steer carriage according to another preferred embodiment of the present invention.

FIG. 3 shows details of another preferred embodiment of the steer carriage 1 according to the present invention. It should be noted that the same reference numerals are used in FIG. 3 for corresponding features shown in FIG. 1 for clarity reasons. This figure shows in more detail the relative positions of the central transfer unit 17, the front transfer unit 19, and rear transfer unit 21. The front transfer unit 19 is supported over front wheel axis 5b, and in particular the central section 5c of the wheel axle 5b wherein it is located the differential drive (not shown).

A sub-frame member 38 supports the central transfer unit 17 and fixes it in position relative to the sub-frame 6. The front transfer unit 19 is also fixed in position relative to the carriage sub-frame 6 by means of a link 35 joining the front transfer unit 19 to the sub-frame 6. Means may be provided between the central section 5c of the front axle 5b and the front transfer unit 19 to allow for relative rotation therebetween. This may simply be in the form of a bearing or a greased plate member located between the front transfer unit 19 and the central section 5c. A similar arrangement may be provided for the rear transfer unit 21 which is located over the central section 7c of the rear wheel axle 7b and is fixed in position relative to the sub-frame 6 by means of a link 37 joining the rear transfer unit 21 to the sub-frame 6. Both the front and rear wheel assemblies 5, 7 are supported via a front turntable 13 and a rear turntable 15. Each turntable 13,15 may include an upper plate 36 fixed to the carriage sub-frame 6, and a lower plate 41,43 upon which the suspension components of the wheel assembly 5, 7 are respectively mounted. Each lower plate 41, 43 can rotate relative to the upper plate 36 thereby allowing steering of the front and rear wheel assemblies 5,7, respectively.

The steering arrangement 42 shown in FIG. 3 includes a front steering link 45 connected to the turntable lower plate 41 of the front wheel assembly 5 by a pivot joint 47. A rear steering link 49 is connected to the turntable lower plate 43 of the rear wheel assembly 7 by means of a further pivot joint 51. The front and rear steering links 45, 49 are interconnected by a pivotably supported interconnecting arm 53. The interconnecting arm 53 is mounted on a steering shaft 52, the rotation of which can provide an equal and opposing displacement of the front and rear steering links 45, 49. This therefore enables the angle of rotation of both the front and rear wheel axles 5b, 7b to be controlled in a coordinated manner, with the angle of rotation of one wheel axle, moving in an equal but opposite rotational direction to the other wheel axle as can be seen in FIG. 2b. This respective movement of the wheel axles 5b, 7b help to facilitate steering of the vehicle while at the same time reducing or eliminating tyre scrubbing issues for the wheels of the steer carriage 1.

The steering shaft 52 can be rotated by mechanical, hydraulic, or electric means. In the arrangement shown in FIG. 3, a mechanical arrangement for rotating the steering shaft 52 is shown. This mechanical arrangement includes a pair of vertical racks 55, each forming part of a rack and pinion steering mechanism (not shown). These racks 55 act to displace a semi circular member 57 in a vertical direction. The radius of curvature of this semi circular member 57 substantially coincides with the radius of curvature about the upright pivotal axis of the steer carriage 1. A rider 59 cooperates with and moves along the semi circular member 57 as it moves along its first call direction of movement. The arm 59 connects to translate this motion into a rotational motion of the steering shaft 52. This motion is then transferred through the interconnecting arm 53 and steering links 47, 49. This results in the pivoting of the turntable lower plates 41, 43 resulting in pivotal motion of the front and rear wheel assemblies 5, 7.

Variations can be made to the above described arrangements without departing from the spirit and scope of the invention as described herein and as claimed in the appended claims.

The claims defining the invention are as follows:

1. A vehicle having a main chassis and a power source for driving the vehicle, a drivable steer carriage pivotally supporting the main chassis about an at least substantially upright pivotal axis, the carriage including front and rear opposed pairs of carriage wheels, said front and rear pair of carriage wheels being respectively driven by a drive transmission including an input shaft at least substantially aligned with said upright pivotal axis such that the power source can transfer power through the input shaft to at least one carriage wheel pair, and a middle non-driven pair of carriage wheels located between said front and rear driven pairs of carriage wheels, wherein the axis of rotation of said middle pair is located below the input shaft.

2. A vehicle according to claim 1 wherein the steer carriage includes a sub-frame and a turntable located between a said driven pair of wheels and the sub-frame, the pair of wheels being supported on a wheel axle supported on the turntable, thereby allowing pivoting of the wheel axle relative to the sub-frame.

3. A vehicle according to claim 2 wherein the steer carriage includes a front turntable supporting a front wheel axle and a rear said turntable supporting a rear wheel axle, said front and rear wheel axles being driven through said drive transmission.

4. A vehicle according to claim 3 wherein the non-driven pair of wheels are supported on a wheel axle located between the front and rear wheel axles, and fixed in position relative to the sub-frame.

5. A vehicle according to claim 3 or 4 further including steering means for controlling the rotation of the turntables relative to the sub-frame, the steering means rotating the front wheel axle in an equal and opposite rotational direction to the rear wheel axle.

6. A vehicle according to claim 1 wherein the power source is supported on the main chassis for driving said at least one pair of carriage wheels through said input shaft.

7. A vehicle according to claim 1 wherein the drive transmission further includes
    a differential drive centrally located on a wheel axle supporting said at least one driven pair of wheels;
    a central transfer unit mounted to the sub-frame, the upright input shaft extending from the central transfer unit, and at least one output shaft extending from the central transfer unit;
    a wheel transfer unit located adjacent the differential drive of the wheel axle, the wheel transfer unit being coupled to the sub-frame; and
    a drive shaft interconnecting the central transfer unit with the wheel transfer unit.

8. A vehicle according to claim 1 wherein the main chassis includes a pair of said drivable steer carriages located adjacent opposing ends of the main chassis.

9. A driveable steer carriage for a vehicle having a main chassis and a power source for driving the vehicle, the steer carriage being adapted to pivotally support the main chassis thereon about an at least substantially upright pivotal axis, the carriage including front and rear opposed pairs of carriage wheels, said front and rear pair of carriage wheels being driven by a drive transmission including an input shaft at least substantially aligned with said upright pivotal axis such that the power source can transfer power through the input shaft to the at least one carriage wheel and a middle non-driven pair of carriage wheels located between said front and rear driven pairs of carriage wheels, wherein the axis of rotation of said middle pair is located below the input shaft.

* * * * *